(12) United States Patent
Jawahar et al.

(10) Patent No.: US 10,776,693 B2
(45) Date of Patent: Sep. 15, 2020

(54) METHOD AND SYSTEM FOR LEARNING TRANSFERABLE FEATURE REPRESENTATIONS FROM A SOURCE DOMAIN FOR A TARGET DOMAIN

(71) Applicant: XEROX CORPORATION, Norwalk, CT (US)

(72) Inventors: Ganesh Jawahar, Chennai (IN); Himanshu Sharad Bhatt, Uttam Nagar (IN); Manjira Sinha, Bengaluru (IN); Shourya Roy, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 776 days.

(21) Appl. No.: 15/420,119

(22) Filed: Jan. 31, 2017

(65) Prior Publication Data
US 2018/0218284 A1    Aug. 2, 2018

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC ........................................................ G06N 3/08
See application file for complete search history.

(56) References Cited

U.S. PATENT DOCUMENTS

| | | | |
|---|---|---|---|
| 7,971,150 B2 * | 6/2011 | Raskutti | G06F 16/355 715/764 |
| 9,002,100 B2 | 4/2015 | Locerf | |
| 9,286,573 B2 | 3/2016 | Singh | |
| 2009/0171956 A1 * | 7/2009 | Gupta | G06F 16/35 |
| 2010/0021026 A1 * | 1/2010 | Collins | G06K 9/00 382/128 |
| 2016/0253597 A1 * | 9/2016 | Bhatt | G06N 20/00 706/12 |

OTHER PUBLICATIONS

Hana Ajakan, Pascal Germain, Hugo Larochelle, Francois Laviolette, and Mario Marchand. 2014. Domain-adversarial neural networks. arXiv preprint arXiv:1412.4446.

(Continued)

*Primary Examiner* — Daniel C Puentes
(74) *Attorney, Agent, or Firm* — Jones Robb, PLLC

(57) ABSTRACT

The disclosed embodiments illustrate a domain adaptation method for learning transferable feature representations from a source domain for a target domain. The method includes receiving input data comprising a plurality of labeled instances of the source domain and a plurality of unlabeled instances of the target domain. The method includes learning common representation shared between the source domain and the target domain, based on the plurality of labeled instances of the source domain. The method includes labeling one or more unlabeled instances in the plurality of unlabeled instances of the target domain, based on the common representation. The method includes determining a target specific representation corresponding to the target domain. The method includes training a target specific classifier based on the target specific representation and the common representation to perform text classification on remaining one or more unlabeled instances of the plurality of unlabeled instances of the target domain.

16 Claims, 4 Drawing Sheets

(56) References Cited

OTHER PUBLICATIONS

John Blitzer, Mark Dredze, and Fernando Pereira. 2007. Biographies, bollywood, boom-boxes and blenders: Domain adaptation for sentiment classification. In Proceedings of Association for Computational Linguistics, pp. 440-447.
Avrim Blum. 1996. On-line algorithms in machine learning. In In Proceedings of the Workshop on On-Line Algorithms, Dagstuhl, pp. 306-325.
Sinno Jialin Pan and Qiang Yang. 2010. A survey on transfer learning. Knowledge and Data Engineering, IEEE Transactions on, 22(10):1345-1359.
Shai Shalev-Shwartz. 2012. Online learning and online convex optimization. Foundations and Trends in Machine Learning, 4(2):107-194.
P. Zhao and S. Hoi. 2010. OTL: A framework of online transfer learning. In Proceedings of International Conference on Machine Learning, pp. 1231-1238.

* cited by examiner

US 10,776,693 B2

METHOD AND SYSTEM FOR LEARNING TRANSFERABLE FEATURE REPRESENTATIONS FROM A SOURCE DOMAIN FOR A TARGET DOMAIN

TECHNICAL FIELD

The presently disclosed embodiments are related, in general, to data processing. More particularly, the presently disclosed embodiments are related to a domain adaptation method and system for learning transferable feature representations from a source domain for a target domain.

BACKGROUND

Mostly, machine learning (ML) based automation systems are supervised systems, and primarily rely on labeled examples coded by analysts for learning specific tasks, such as text classification. The idea of using ML-based automation systems has led to significant contributions to domain adaptation and transfer learning (DA/TL) techniques. The DA/TL techniques leverage knowledge, such as labeled data, from one or multiple source domains to learn an accurate model for unlabeled data in a target domain.

Typically, systems that deploy DA/TL techniques for text classification work on the assumption that the source data is labeled and the target data is unlabeled. Such systems learn a common representation where distributions of the source and the target data look as similar as possible. In accordance with such common representation, a model (or a classifier) trained on the source data is expected to perform efficiently on the target data also. Learning such common representation is utilized to transfer knowledge from the source domain to the target domain, however, in certain scenarios, it may result in negative transfer of features as each domain comprises domain specific features which are highly discriminating only within a domain and thus, may negatively contribute to the learning in the target domain if transferred in a brute force manner.

Further, traditional methods of learning the common representation between the source domains to the target domain may exhibit limited performance characteristics. One challenge may be that such methods do not explicitly exclude source specific representations. Another challenge may be that such methods miss out the discriminative features in the target domain. Thus, an advanced technique to learn transferable representations may be desired that mitigates such negative transfer of features and aforesaid challenges.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided domain adaptation method for learning transferable feature representations from a source domain for a target domain. The domain adaptation method includes receiving, by one or more processors in the data processing server, real-time input data from a computing device over a communication network. The received real-time input data comprises a plurality of labeled instances of the source domain and a plurality of unlabeled instances of the target domain. The domain adaptation method further includes learning, by a domain regression processor in the data processing server, a common representation shared between the source domain and the target domain, based on the plurality of labeled instances of the source domain. The domain adaptation method further includes labeling, by an adaptation processor in the data processing server, one or more unlabeled instances in the plurality of unlabeled instances of the target domain, based on the learned common representation. The domain adaptation method further includes determining, by the adaptation processor in the data processing server, a target specific representation corresponding to the target domain, based on the one or more labeled instances of the target domain. The domain adaptation method further includes training, by the adaptation processor in the data processing server, a target specific classifier based on the determined target specific representation and the learned common representation to perform automatic text classification on remaining one or more unlabeled instances of the plurality of unlabeled instances of the target domain.

According to embodiments illustrated herein, there is provided a domain adaptation system for learning transferable feature representations, by a data processing server, from a source domain for a target domain. The system includes one or more processors in a data processing server configured to receive real-time input data from a computing device over a communication network. The received real-time input data comprises a plurality of labeled instances of the source domain and a plurality of unlabeled instances of the target domain. The system further includes a domain regression processor in the data processing server configured to learn a common representation shared between the source domain and the target domain, based on the plurality of labeled instances of the source domain. The system further includes an adaptation processor in the data processing server configured to label one or more unlabeled instances in the plurality of unlabeled instances of the target domain, based on the learned common representation. The adaptation processor in the data processing server is further configured to determine a target specific representation corresponding to the target domain, based on the one or more labeled instances of the target domain. The adaptation processor in the data processing server is further configured to train a target specific classifier based on the determined target specific representation and the learned common representation to perform automatic text classification on remaining one or more unlabeled instances of the plurality of unlabeled instances of the target domain.

According to embodiments illustrated herein, there is provided a computer program product for use with a computing device. The computer program product comprises a non-transitory computer readable medium storing a computer program code for domain adaptation for learning transferable feature representations from a source domain for a target domain. The computer program code is executable by one or more processors to receive real-time input data from a computing device over a communication network. The received real-time input data comprises a plurality of labeled instances of the source domain and a plurality of unlabeled instances of the target domain. The computer program code is further executable by a domain regression processor to learn a common representation shared between the source domain and the target domain, based on the plurality of labeled instances of the source domain. The computer program code is further executable by an adaptation processor to label one or more unlabeled instances in the plurality of unlabeled instances of the target domain, based on the learned common representation. The computer program code is further executable by the adaptation processor to determine a target specific representation corresponding to the target domain, based on the one or more labeled instances of the target domain. The computer program code is further executable by the adaptation processor to train a target specific classifier based on the determined target specific representation and the learned common representation to perform automatic text classification on remaining one or more unlabeled instances of the plurality of unlabeled instances of the target domain.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
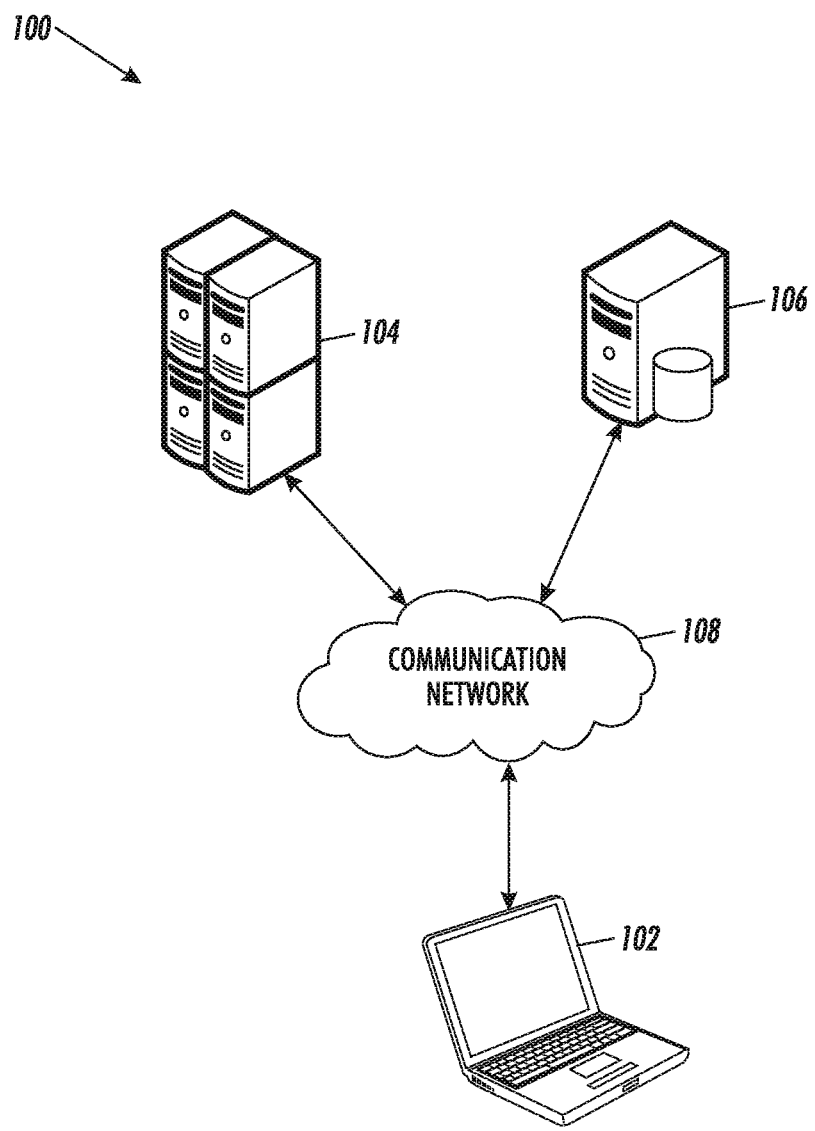
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below:

A "computing device" refers to a computer, a device (that includes one or more processors/microcontrollers and/or any other electronic components), or a system (that performs one or more operations according to one or more programming instructions/codes) associated with a user. Examples of the computing device may include, but are not limited to, a desktop computer, a laptop, a personal digital assistant (PDA), a mobile device, a smartphone, and a tablet computer (e.g., iPad® and Samsung Galaxy Tab®).

A "source domain" corresponds to a technical or business field for which a classifier is already trained. In an embodiment, labeled instances (such as, a plurality of source text segments) from the source domain are utilized to train the classifier to label/classify a plurality of unlabeled instances in a target domain.

A "target domain" refers to a technical or business field for which a classifier is to be trained. In an embodiment, a plurality of labeled instances (such as, a plurality of source text segments) from the source domain may be utilized to train the classifier to label/classify a plurality of unlabeled instances in the target domain.

"Input data" refers to labeled instances of a source domain and unlabeled instances of a target domain. The input data may be received in real time, near real time from a computing device.

A "plurality of labeled instances" of a source domain corresponds to instances that are associated with a label in a plurality of labels associated with the source domain. Examples of the labeled instances may include labeled images, labeled text segments, and/or labeled audio segments associated with the source domain. For instance, the plurality of labeled instances may correspond to labeled text segments, such as comments, reviews, messages, posts, shares, tweets, and/or the like by one or more users on a social networking site.

A "plurality of unlabeled instances" of a target domain corresponds to instances that are to be associated with a label in a plurality of labels associated with the target domain by use of a classifier. Examples of the plurality of unlabeled instances may include unlabeled images, unlabeled text segments, and/or unlabeled audio segments associated with the target domain. For instance, the plurality of unlabeled instances may correspond to unlabeled text segments, such as comments, reviews, messages, posts, shares, tweets, and/or the like by one or more users on a social networking site.

A "source specific representation" comprises a plurality of features that is specific to a source domain. For instance, the source specific representation may include an M-dimensional feature vector comprising unigrams, bigrams, and/or the like extracted from a plurality of labeled instances of the source domain. The extracted unigrams, bigrams, and/or the like may be specific to the source domain.

A "common representation" comprises a plurality of features that is shared between a source domain and a target domain. For instance, the common representation may include a K-dimensional feature vector comprising unigrams, bigrams, and/or the like extracted from a plurality of labeled instances of the source domain. The extracted unigrams, bigrams, and/or the like may be common between the plurality of labeled instances of the source domain and a plurality of unlabeled instances of a target domain.

A "target specific representation" comprises a plurality of features that is specific to a target domain. For instance, the target specific representation may include a P-dimensional feature vector comprising unigrams, bigrams, and/or the like extracted from one or more labeled instances of the target domain. The extracted unigrams, bigrams, and/or the like may be specific to the target domain.

"Positive contribution" of a representation, such as source specific representation or a common representation, in classification of unlabeled instances of a source domain refers to a decrease in source classification error for the source domain.

"Penalized contribution" of a source specific representation in learning of a classifier refers to a negative contribution. The penalized contribution of the source specific representation may provide a domain independence to the classifier. Domain independence may represent that the classifier predicts an association of an instance with a source domain or target domain with equal likelihood.

"Domain divergence" refers to a measure of divergence or variation in distributions (such as instances) of a source domain and a target domain. In an embodiment, the domain divergence may be utilized by a classifier to predict the likelihood of association of an instance with the source domain or the target domain. Further, the classification error of the classifier may be dependent on the domain divergence. In an embodiment, domain independence of a classifier may be acquired by reducing the domain divergence among the training data of the classifier.

A "classification" refers to categorization of a plurality of unlabeled instances of a target domain and/or a plurality of unlabeled instances of a source domain. The classification may refer to an association of a label with an unlabeled instance. The classification may be performed by a trained classifier.

A "label" corresponds to a tag/metadata associated with a text-segment/keyword/audio-segment/image. In an embodiment, the label associated with the text-segment/keyword/audio-segment/image may be indicative of one or more properties, such as an emotion/sentiment or polarity, depicted by the text-segment/keyword/audio-segment/image.

A "pseudo-label" corresponds to a label that is determined by a generalized classifier for one or more unlabeled instances of the target domain. Based on pseudo-labeled instances of the target domain, an adaptation processor may perform an iterative process to determine target specific representation corresponding to the target domain. Such target specific representation may be updated in each iteration of the iterative process.

"Learning" refers to a step performed prior to training of a classifier. During learning, the classifier explores the training data. For example, a domain regression processor learns a common representation and a source specific representation. The common representation provides a positive contribution and the source specific representation provides a penalized contribution to the learning by the domain regression processor to acquire domain independence. Thus, the learned domain regression processor may train a classifier for classification of unlabeled instance of a target domain.

"Training" refers to a process of updating/tuning a classifier using training data, such that the classifier, once trained, may be able to label unlabeled instances in a target domain and classify the labeled target instances into a category of a plurality of categories associated with the target domain. For example, the training data may include instances, such as text segments, that are labeled. An untrained classifier may determine a plurality of features from the labeled instances. The untrained classifier may further associate the determined plurality of features with the labels of the instances. This process of determination of the plurality of features and the association of the plurality of features with labels may correspond to the training of the classifier. Further, for labeling an unlabeled instance, the trained classifier may determine another plurality of features from the unlabeled instance. The classifier may then determine a likelihood of the association of the determined other plurality of features of the unlabeled instance with the labels. Thereafter, the classifier may label the unlabeled instance with a label that has a maximum likelihood of association with the determined other plurality of features of the unlabeled instance.

A "generalized classifier" refers to a mathematical model that may be trained based on positive contribution of common representation shared between a source domain and a target domain. The generalized classifier may be utilized to perform classification on unlabeled instances of the target domain to generate pseudo-labeled instances. Examples of the generalized classifier may include, but are not limited to, a Support Vector Machine (SVM), a Logistic Regression, a Bayesian classifier, a Decision Tree classifier, a Copula-based classifier, a K-Nearest Neighbors (KNN) classifier, or a Random Field (RF) classifier.

"Generalization" refers to a phase in training of a target domain classifier during which a common representation shared between a source domain and a target domain is learned. The common representation may be learned based on labeled instances of the source domain.

"Adaptation" refers to a phase in training of a target domain classifier during which a learned common representation that is shared between a source domain and a target domain is adapted. The common representation may be adapted based on labeled or pseudo-labeled instances of the target domain for enhanced performance of the target classifier.

A "prediction" refers to a determination of a likelihood of association of an instance with a source domain or a target domain. In an embodiment, a classifier may be trained to predict the likelihood of association of the instance with the source domain or the target domain. In an embodiment, domain independence may be attained based on the prediction of the likelihood of association of the instance with the source domain or the target domain.

FIG. 1 is a block diagram of a system environment in which various embodiments may be implemented. With reference to FIG. 1, there is shown a system environment 100 that includes one or more computing devices, such as a user-computing device 102, one or more application servers, such as a data processing server 104, one or more database servers, such as a database server 106, and a communication network 108. Various devices in the system environment 100 may be interconnected over the communication network 108. FIG. 1 shows, for simplicity, one computing device, such as the user-computing device 102, one application server, such as the data processing server 104, and one database server, such as the database server 106. However, it will be apparent to a person having ordinary skill in the art that the disclosed embodiments may also be implemented using multiple computing devices, multiple application servers, and multiple database servers, without departing from the scope of the disclosure.

The user-computing device 102 may refer to a computing device (associated with a user) that may be communicatively coupled to the communication network 108. The user-computing device 102 may include one or more processors and one or more memory units. The one or more memory units may include a computer readable code that may be executable by the one or more processors to perform one or more operations specified by the user (not shown). In an embodiment, the user may utilize the user-computing device 102 to transmit a classification request to the data processing server 104 for classification of a plurality of unlabeled instances of a target domain. Examples of the plurality of unlabeled instances of the target domain may include, but are not limited to, unlabeled images, unlabeled text segments, and/or unlabeled audio segments. In an embodiment, along with the classification request the user may transmit the plurality of unlabeled instances of the target domain and a plurality of labeled instances associated with a source domain, based on which the classification may be performed. Examples of the plurality of labeled instances of the source domain may include, but are not limited to, labeled images, labeled text segments, and/or labeled audio segments. In an embodiment, each of the plurality of labeled instances of the source domain may be associated with a label from a plurality of labels associated with the source domain. The user-computing device 102 may further receive a user-interface from the data processing server 104 to present a result of the classification to the user. The user-computing device 102 may correspond to a variety of computing devices, such as, but not limited to, a laptop, a PDA, a tablet computer, a smartphone, and a phablet.

The data processing server 104 may refer to a computing device or a software framework hosting an application or a software service that may be communicatively coupled to the communication network 108. In an embodiment, the data processing server 104 may be implemented to execute procedures, such as, but not limited to, programs, routines, or scripts stored in one or more memory units for supporting the hosted application or the software service. In an embodiment, the hosted application or the software service may be configured to perform one or more predetermined operations for classification based on learning of transferable feature representations from the source domain for the target domain. In an embodiment, the data processing server 104 may be configured to receive the classification request from the user-computing device 102 for classification of the plurality of unlabeled instances of the target domain. In an embodiment, the classification request may include the plurality of unlabeled instances of the target domain and the plurality of labeled instances of the source domain. In another embodiment, the classification request may not include the plurality of labeled instances of the source domain. In such a scenario, the data processing server 104 may be configured to retrieve the labeled instances of the source domain from one or more social media websites or the database server 106. The unlabeled instances of the target domain and the labeled instances of the source domain may correspond to real-time input data, such that the unlabeled instances of the target domain and the labeled instances of the source domain may be received in real time or near real time from the user-computing device 102.

A person having ordinary skill in the art will understand that the scope of the disclosure is not limited to the utilization of the user-computing device 102 by a single user. In an embodiment, the user-computing device 102 may be utilized by more than one users to transmit the classification request.

The data processing server 104 may be further configured to learn a source specific representation corresponding to the source domain and a common representation shared between the source domain and the target domain based on the plurality of labeled instances of the source domain. The source specific representation may include a plurality of source specific features extracted from the plurality of labeled instances (such as a text segment, an audio segment, and/or the like) of the source domain that are used specifically in accordance with the source domain. Examples of the plurality of source specific features may include unigrams, bigrams, special graphical characters, and/or the like. The common representation may include a plurality of common features extracted from the plurality of labeled instances (such as a text segment, an audio segment, and/or the like) of the source domain that are used in the source domain as well as in the target domain. Examples of the plurality of common features may include unigrams, bigrams, special graphical characters, and/or the like that are used in both the plurality of labeled instances of the source domain and the plurality of unlabeled instances of the target domain. The learning of the source specific representation and the common representation has been explained later in FIG. 3.

In an embodiment, the data processing server 104 may be further configured to classify a plurality of unlabeled instances of the source domain, based on the source specific representation and the common representation. Examples of the plurality of unlabeled instances of the source domain may include, but are not limited to, unlabeled images, unlabeled text segments, and/or unlabeled audio segments. The source specific representation and the common representation may contribute positively for labeling the plurality of unlabeled instances of the source domain. The data processing server 104 may be further configured to train a generalized classifier based on the common representation. The generalized classifier may be trained based on positive contribution from the common representation and may be domain independent. The trained generalized classifier may be further used by the data processing server 104 to label one or more unlabeled instances in the plurality of unlabeled instances of the target domain to generate pseudo-labeled instances of the target domain.

The data processing server 104 may be further configured to determine a target specific representation corresponding to the target domain, based on the pseudo-labeled instances of the target domain. The target specific representation may include a plurality of target specific features extracted from the pseudo-labeled instances (such as a text segment, an audio segment, and/or the like) of the target domain that are used specifically in accordance with the target domain. The identification of the plurality of target specific features from the pseudo-labeled instances may be based on a positive contribution of the identified plurality of target specific features to the data processing server 104. Examples of the plurality of target specific features may include unigrams, bigrams, special graphical characters, and/or the like. The determination of the target specific representation may correspond to an iterative process, such that the target specific representation may be updated in each iteration of the iterative process. The update of the target specific representation may include addition of new target specific features to the target specific representation in each iteration. Further, the update of the target specific representation may include merging of a first target specific feature in the plurality of target specific features with a second target specific feature in the plurality of target specific features to obtain a single feature. The merging may be based on a similarity score between the first target specific feature and the second target specific feature. The data processing server 104 may use one or more similarity measures known in the art for the generation of the similarity score. Examples of the one or more similarity measures known in the art for the generation of similarity score may include, but are not limited to, cosine similarity measure and Lavenshtein similarity measure.

In an embodiment, the data processing server 104 may be configured to train a target specific classifier based on the determined target specific representation and the learned common representation. The data processing server 104 may train the target specific classifier after the determination of the target specific representation. The data processing server 104 may further use the trained target specific classifier to perform automatic classification (such as text classification, audio classification, and/or image classification) on the remaining one or more unlabeled instances of the plurality of unlabeled instances of the target domain. The data processing server 104 may further render the result of the automatic text classification at the user interface of the user-computing device 102, over the communication network 108.

The data processing server 104 may be realized through various types of application servers, such as, but not limited to, a Java application server, a .NET framework application server, a Base4 application server, a PHP framework application server, or any other application server framework. An embodiment of the structure of the data processing server 104 has been discussed later in FIG. 2.

A person having ordinary skill in the art will understand that the scope of the disclosure is not limited to realizing the data processing server 104 and the user-computing device 102, as separate entities. In an embodiment, the data processing server 104 may be realized as an application program installed on and/or running on the user-computing device 102, without deviating from the scope of the disclosure.

The database server 106 may refer to a computing device that may be communicatively coupled to the communication network 108. In an embodiment, the database server 106 may be configured to perform one or more database operations. The one or more database operations may include one or more of, but not limited to, receiving, storing, processing, and transmitting one or more queries, data, or content. The one or more queries, data, or content may be received/transmitted from/to various components of the system environment 100. In an embodiment, the database server 106 may be configured to store the plurality of labeled instances of the source domain. The database server 106 may receive one or more queries from the data processing server 104 for the retrieval of the plurality of labeled instances of the source domain. For querying the database server 106, one or more querying languages, such as, but not limited to, SQL, QUEL, and DMX, may be utilized. In an embodiment, the database server 106 may connect to the data processing server 104, using one or more protocols, such as, but not limited to, the ODBC protocol and the JDBC protocol. In an embodiment, the database server 106 may be realized through various technologies such as, but not limited to, Microsoft® SQL Server, Oracle®, IBM DB2®, Microsoft Access®, PostgreSQL®, MySQL®, and SQLite®.

The communication network 108 may correspond to a medium through which content and messages flow between various devices, such as the user-computing device 102, the data processing server 104, and the database server 106, of the system environment 100. Examples of the communication network 108 may include, but are not limited to, the Internet, a cloud network, a Wireless Fidelity (Wi-Fi) network, a Wireless Local Area Network (WLAN), a Local Area Network (LAN), a wireless personal area network (WPAN), a wireless wide area network (WWAN), a cloud network, a Long Term Evolution (LTE) network, a plain old telephone service (POTS), and/or a Metropolitan Area Network (MAN). Various devices in the system environment 100 can connect to the communication network 108 in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), Light Fidelity (Li-Fi), and/or other cellular communication protocols or Bluetooth (BT) communication protocols.

Figure 2:
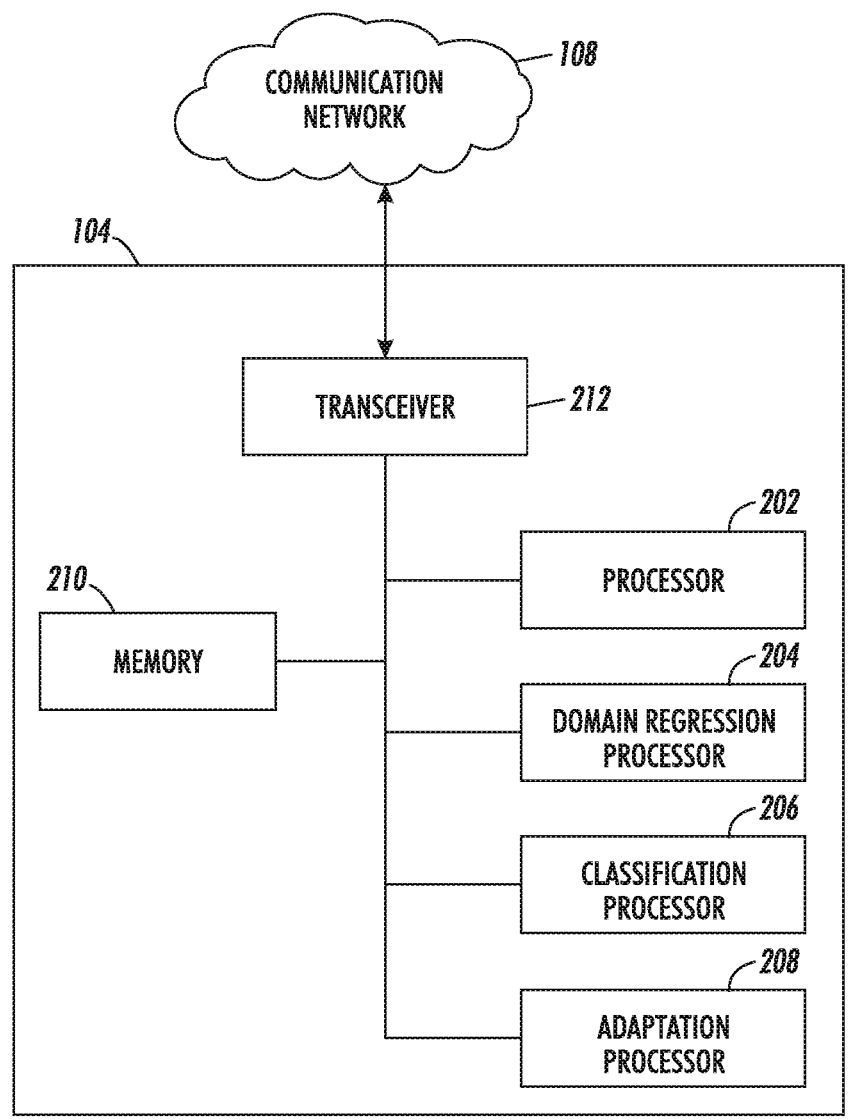
FIG. 2 is a block diagram that illustrates a data processing server, in accordance with at least one embodiment.

FIG. 2 is a block diagram that illustrates an application server, in accordance with at least one embodiment. FIG. 2 has been described in conjunction with FIG. 1. With reference to FIG. 2, there is shown a block diagram of an application server (such as the data processing server 104) that may include a processor 202, a domain regression processor 204, a classification processor 206, an adaptation processor 208, a memory 210, and a transceiver 212. The processor 202 is communicatively coupled to the domain regression processor 204, the classification processor 206, the adaptation processor 208, the memory 210, and the transceiver 212.

The processor 202 includes suitable logic, circuitry, and/or interfaces that are configured to execute one or more instructions stored in the memory 210. The processor 202 may further comprise an arithmetic logic unit (ALU) (not shown) and a control unit (not shown). The ALU may be coupled to the control unit. The ALU may be configured to perform one or more mathematical and logical operations and the control unit may control the operation of the ALU. The processor 202 may execute a set of instructions/programs/codes/scripts stored in the memory 210 to perform one or more operations for classification (such as text classification, image classification, and/or audio classification) based on learning of transferable feature representations from a source domain for a target domain. In an embodiment, the processor 202 may be configured to train a generalized classifier based on the common representation shared between the source domain and the target domain. The processor 202 may be implemented based on a number of processor technologies known in the art. Examples of the processor 202 may include, but are not limited to, an X86-based processor, a Reduced Instruction Set Computing (RISC) processor, and/or a Complex Instruction Set Computing (CISC) processor. In an alternate embodiment, the processor 202 may be implemented as an Application-Specific Integrated Circuit (ASIC) processor specially configured for training of classifiers for various target domains.

The domain regression processor 204 may comprise suitable logic, circuitry, interfaces, and/or code that may be configured to execute one or more instructions stored in the memory 210. The domain regression processor 204 may be configured to learn the common representation shared between the source domain and the target domain and the source specific representation. The domain regression processor 204 may be configured to learn the common representation, such that a classifier trained on the common representation may predict the association of an instance with the source domain and the target domain with equal likelihood. Thus, the domain regression processor 204 may be configured to attain a minimum domain divergence for the common representation. Examples of the domain regression processor 204 may include, but are not limited to, an X86-based processor, a RISC processor, an ASIC processor, a CISC processor, and/or other processor.

The classification processor 206 may comprise suitable logic, circuitry, interfaces, and/or code that may be configured to execute one or more instructions stored in the memory 210. In an embodiment, the classification processor 206 may be configured to classify unlabeled instances of the source domain based on the source specific representation and the common representation based on a positive contribution from the source specific representation and the common representation. The classification processor 206 may be configured to attain a minimum source classification error. Examples of the classification processor 206 may include, but are not limited to, an X86-based processor, a RISC processor, an ASIC processor, a CISC processor, and/or other processor.

The adaptation processor 208 may comprise suitable logic, circuitry, interfaces, and/or code that may be configured to execute one or more instructions stored in the memory 210. In an embodiment, the adaptation processor 208 may be configured to use the trained generalized classifier for labeling the one or more unlabeled instances in the plurality of unlabeled instances of the target domain. The one or more unlabeled instances of the target domain that are labeled by the generalized classifier may be referred to as the pseudo-labeled instances of the target domain. The adaptation processor 208 may be further configured to determine the target specific representation corresponding to the target domain, based on the pseudo-labeled instances of the target domain by performing an iterative process. The target specific representation may be updated in each iteration of the iterative process. Further, the adaptation processor 208 may be configured to train the target specific classifier based on the target specific representation and the common representation. The adaptation processor 208 may be configured to use the trained target specific classifier to perform automatic classification (such as the text classification, the audio classification and/or the image classification) on the remaining one or more unlabeled instances of the plurality of unlabeled instances of the target domain. Examples of the adaptation processor 208 may include, but are not limited to, an X86-based processor, a RISC processor, an ASIC processor, a CISC processor, and/or other processor.

A person having ordinary skill in the art will appreciate that the scope of the disclosure is not limited to realizing the processor 202, the domain regression processor 204, the classification processor 206, and the adaptation processor 208, as separate entities. In an embodiment, the functionalities of the domain regression processor 204, the classification processor 206, and the adaptation processor 208 may be implemented within the processor 202, without departing from the spirit of the disclosure. Further, a person skilled in the art will understand that the scope of the disclosure is not limited to realizing the domain regression processor 204, the classification processor 206, and the adaptation processor 208 as hardware components. In an embodiment, the domain regression processor 204, the classification processor 206, and the adaptation processor 208 may be implemented as software modules included in computer program code (stored in the memory 210), which may be executable by the processor 202 to perform the functionalities of the domain regression processor 204, the classification processor 206, and the adaptation processor 208.

The memory 210 may be operable to store one or more machine codes, and/or computer programs having at least one code section executable by the processor 202. The memory 210 may store the one or more sets of instructions that are executable by the processor 202, the domain regression processor 204, the classification processor 206, the adaptation processor 208, and the transceiver 212. In an embodiment, the memory 210 may include one or more buffers (not shown). In an embodiment, the one or more buffers may be configured to store the source specific representation, the common representation, and the target specific representation. The memory 210 may be further configured to store the trained generalized classifier and the trained target specific classifier. In an embodiment, the one or more buffers may be further configured to store the plurality of labeled source instances and the plurality of labeled target instances. Examples of some of the commonly known memory implementations may include, but are not limited to, a random access memory (RAM), a read only memory (ROM), a hard disk drive (HDD), and a secure digital (SD) card. In an embodiment, the memory 210 may include machine code and/or computer programs that are executable by the processor 202 to perform specific operations for automatic classification based on learning of transferable feature representations from the source domain for the target domain. It will be apparent to a person having ordinary skill in the art that the one or more instructions stored in the memory 210 may enable the hardware of the data processing server 104 to perform the one or more predetermined operations, without deviating from the scope of the disclosure.

The transceiver 212 transmits/receives messages and data to/from various components, such as the user-computing device 102 of the system environment 100, over the communication network 108. In an embodiment, the transceiver 212 may be communicatively coupled to the communication network 108. In an embodiment, the transceiver 212 may be configured to receive the request from the user-computing device 102 to perform classification based on learning of transferable feature representations from the source domain for the target domain. In an embodiment, the transceiver 212 may be further configured to transmit the trained generalized classifier to the database server 106 for storage. In an embodiment, the transceiver 212 may be further configured to transmit the result of automatic classification performed on the unlabeled instances of the target domain to the user-computing device 102. The transceiver 212 may implement one or more known technologies to support wired or wireless communication with the communication network 108. In an embodiment, the transceiver 212 may include circuitry, such as, but not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 212 may communicate via wireless communication with networks, such as the Internet, an Intranet and/or a wireless network, such as a cellular telephone network, a WLAN and/or a MAN. The wireless communication may use any of a plurality of communication standards, protocols, and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, and a protocol for email, instant messaging, and/or Short Message Service (SMS).

The working of the data processing server 104 for automatic classification (such as text classification) based on learning of transferable feature representations from a source domain for a target domain has been explained later in FIGS. 3 and 4.

Figure 3:
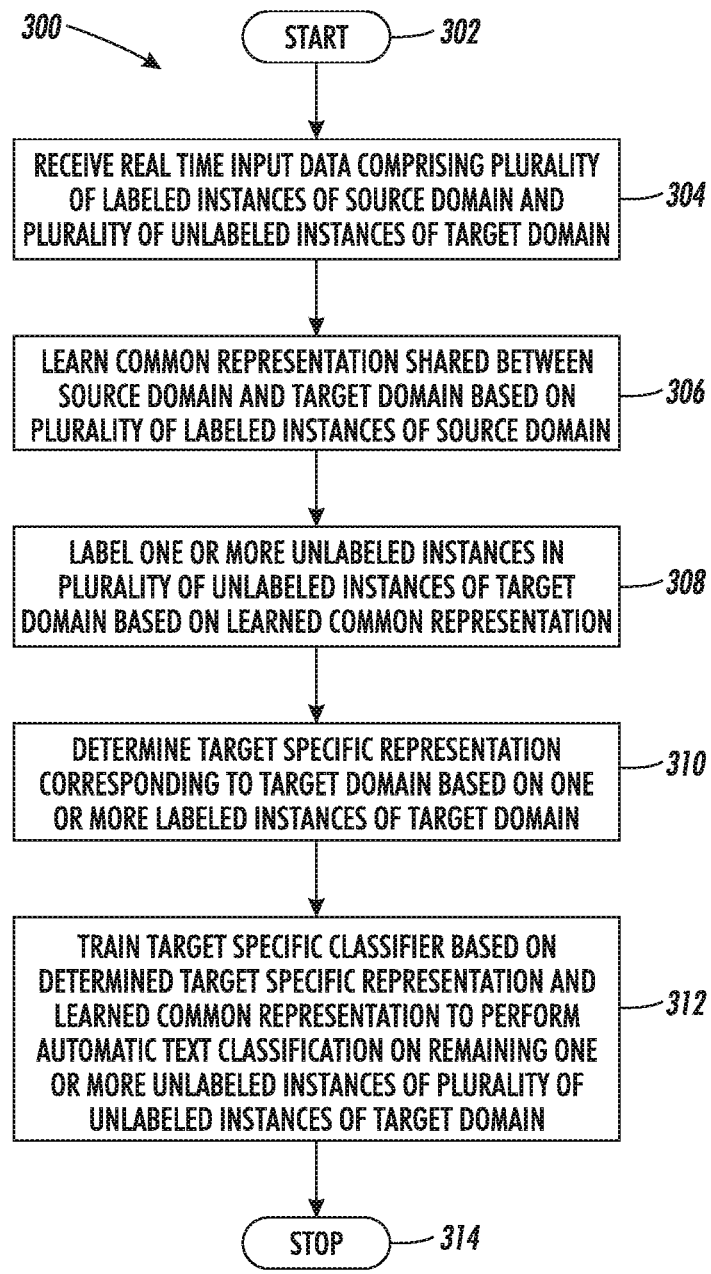
FIG. 3 depicts a flowchart that illustrates a domain adaptation method for text classification based on learning of transferable feature representations from a source domain for a target domain, in accordance with at least one embodiment.

FIG. 3 depicts a flowchart that illustrates a domain adaptation method for learning transferable feature representations from a source domain for a target domain for text classification, in accordance with at least one embodiment. FIG. 3 is described in conjunction with FIG. 1 and FIG. 2. With reference to FIG. 3, there is shown a flowchart 300 that a domain adaptation method for learning transferable feature representations from a source domain for a target domain for text classification. A person having ordinary skill in the art will understand that the examples, as described in FIG. 3, are for illustrative purpose and should not be construed to limit the scope of the disclosure. The domain adaptation method starts at step 302 and proceeds to step 304.

At step 304, real-time input data comprising a plurality of labeled instances of a source domain and a plurality of unlabeled instances of a target domain is received. The processor 202 in association with the transceiver 212 may be configured to receive the real-time input data comprising the plurality of labeled instances of the source domain and the plurality of unlabeled instances of the target domain. In an embodiment, the processor 202 may be configured to receive the real time input data from the user-computing device 102, via the communication network 108.

In an embodiment, the plurality of labeled instances of the source domain may correspond to labeled images, labeled text segments, and/or labeled audio segments. In an embodiment, the labeling of the instances of the source domain may be performed manually by one or more users (not shown). The one or more users may label the instances of the source domain for a plurality of categories associated with the source domain. For example, the plurality of instances of the source domain (such as "BOOKS") may correspond to a plurality of text segments (such as user reviews about books) and the plurality of categories of the source domain may include a positive category and a negative category. The positive category may be associated with a label "1" and the negative category may be associated with a label "0." A text segment may be labeled "1" based on a rating of "four stars" or above provided by the one or more users. A text segment may be labeled "0" based on a rating of "three stars" or below provided by the one or more users. The one or more users may rate the plurality of text segments (such as reviews) of the source domain (such as "BOOKS") based on one or more criteria associated with the plurality of categories. For example, a criteria associated with the plurality of categories may correspond to a type of emotion, such as positive emotion or negative emotion. The positive category may be associated with the positive emotion and the negative category may be associated with negative emotion. Thus, a user in the one or more users may rate a text segment of the source domain with "four stars" or above, if the text segment depicts positive emotion and the user may further rate another text segment of the source domain with "three stars" or below, if the text segment depicts negative emotion. In another example, instead of rating, the one or more users may directly label the plurality of text segments based on the criteria associated with the plurality of categories. In an embodiment, the unlabeled instances of the target domain may correspond to unlabeled images, unlabeled text segments, and/or unlabeled audio segments.

A person having ordinary skill in the art will understand that the scope of the disclosure is not limited to the labeling of the instances of a source domain based on a type of emotion. Any other criteria, such as parts of speech labeling and/or the like, may also be used for the labeling of instances of the source domain.

In an exemplary scenario, the real-time input data received from the user-computing device 102 may constitute a first input layer of a first neural network. The plurality of labeled instances (S) of the source domain ($D_S$) may be represented by equation (1) and the plurality of unlabeled instances (T) of the target domain ($D_T$) may be represented by equation (2), as shown below:

$$S=\{(x_i^s, y_i^s)\}_{i=1}^m \qquad (1)$$

where, $x_i^s$ represents an $i^{th}$ labeled instance in the plurality of labeled instances (S) of the source domain ($D_S$);

$y_i^s$ represents a label of the $i^{th}$ labeled instance of the source domain ($D_S$); and m represents a count of the labeled instances in the plurality of labeled instances (S) of the source domain ($D_S$).

$$T=\{(x_i^t)\}_{i=1}^{m'} \qquad (2)$$

where, $x_i^t$ represents an $i^{th}$ unlabeled instance in the plurality of unlabeled instances (T) of the target domain ($D_T$); and m' represents a count of the unlabeled instances in the plurality of unlabeled instances (T) of the target domain ($D_T$).

A person having ordinary skill in the art will understand that the abovementioned exemplary scenario is for illustrative purpose and should not be construed to limit the scope of the disclosure.

At step 306, a common representation shared between the source domain and the target domain is learned based on the plurality of labeled instances of the source domain. In an embodiment, the domain regression processor 204 in association with the processor 202 may be configured to learn the common representation shared between the source domain and the target domain based on the plurality of labeled instances of the source domain. The domain regression processor 204 may be further configured to learn a source specific representation corresponding to the source domain, based on the plurality of labeled instances of the source domain. The common representation may include a plurality of common features shared between the source domain and the target domain. The source specific representation may include a plurality of source specific features that specific to the source domain.

Prior to the learning of the common representation and the source specific representation, the processor 202 may be configured to extract a plurality of features from the plurality of labeled instances of the source domain. In an exemplary scenario, the plurality of labeled instances may correspond to the plurality of labeled text segments of the source domain (such as "BOOKS"). In such a case, the processor 202 may extract an N-dimensional feature vector including unigrams and bigrams from the plurality of labeled text segments of the source domain. The processor 202 may use one or more feature extraction techniques, such as term frequency-inverse document frequency (TF-IDF), known in the art. The extracted plurality of features may constitute a first hidden layer of the first neural network.

A person having ordinary skill in the art will understand that the scope of the abovementioned exemplary scenario is for illustrative purpose and should not be construed to limit the scope of the disclosure.

Thereafter, the domain regression processor 204 may be configured to learn the common representation and the source specific representation from the extracted plurality of features. The domain regression processor 204 may be configured to partition the first hidden layer of the first neural network by learning the common representation and the source specific representation. The domain regression processor 204 may partition the first hidden layer into the common representation and the source specific representation, such that a source classification error of the first neural network is minimized. The domain regression processor 204 further ensures that the domain divergence associated with the common representation in the partitioned first hidden layer is minimum. Alternatively stated, the learning of the common representation by the domain regression processor 204 may be based on a minimization of the domain divergence between the source domain and the target domain. The minimum source classification error may depict that if a classifier is trained based on the source specific representation and the common representation, collectively, an error in the classification of an unlabeled text segment of the source domain by the trained classifier is minimum. Further, the minimum domain divergence may depict that if a classifier is trained based on the common representation, the trained classifier may predict the association of an instance with the source domain and the target domain with equal likelihood. Alternatively stated, the minimization of the domain divergence between the source domain and the target domain may be based on a prediction of a likelihood by the domain regression processor 204 that an instance is from the source domain or the target domain. Thus, the common representation becomes domain independent by attaining minimum domain divergence.

However, a person having ordinary skill in the art will appreciate that the usage of words, such as minimize, maximize, optimize, and/or any other similar words, in the disclosure are to be construed broadly within the ongoing practical context, and should not be construed as yielding a provable mathematical maximum or optimum solution.

For example, after partitioning of the first hidden layer, the common representation may include a plurality of common features (such as a K-dimensional feature vector including unigrams and/or bigrams) that are used in the source domain as well as in the target domain. The domain regression processor 204 may determine the plurality of common features that are present in both the plurality of labeled instances of the source domain and the plurality of unlabeled instances of the target domain, and have a TF-IDF score greater than the predefined threshold. The source specific representation may include a plurality of source specific features (such as an M-dimensional feature vector including unigrams and/or bigrams) that are used specifically in accordance with the source domain. The domain regression processor 204 may determine the plurality of source specific features that are present in the plurality of labeled instances of the source domain only and have a TF-IDF score greater than a predefined threshold. The predefined threshold may be specified by the user.

In an embodiment, the partitioned first hidden layer (i.e., the common representation and the source specific representation) may be connected to the input layer (i.e., including the plurality of labeled instances of the source domain and the plurality of unlabeled instances of the target domain). In an exemplary scenario, the partitioned first hidden layer (i.e., including the source specific representation and the common representation) (h(x)) of the first neural network may be represented by equation (3), as shown below:

$$h(x) = h_{ss}(x) + h_c(x) \quad (3)$$

where, $h_{ss}(x)$ represents the source specific representation included in the partitioned first hidden layer (h(x)) of the first neural network; and $h_c(x)$ represents the common representation included in the partitioned first hidden layer (h(x)) of the first neural network.

A person having ordinary skill in the art will understand that the abovementioned exemplary scenario is for illustrative purpose and should not be construed to limit the scope of the disclosure.

In an embodiment, the common representation and the source specific representation may contribute positively to the source classification error. For example, the minimized source classification error may be represented by equation (4), as shown below:

$$\min_{W,V,b,c} \left[ \frac{1}{m} \sum_{i=1}^{m} L(f(x_i^s), y_i^s) \right] \quad (4)$$

where,

W, V, b, c represent various parameters associated with the first neural network;

$f(x_i^s)$ represents a function by use of which an unlabeled source instance $(x_i^s)$ is associated with a label $y_i^s$; and $$\frac{1}{m} \sum_{i=1}^{m} L(f(x_i^s), y_i^s)$$

represents the source classification error, where $$L(f(x_i^s), y_i^s) = \log \frac{1}{f_{y_i^s}(x_i^s)}.$$

The common representation may further contribute positively and the source specific representation may contribute negatively to the domain regression processor 204 for attaining minimum domain divergence. In an embodiment, the domain regression processor 204 may be configured to predict a likelihood that an instance is from the source domain or the target domain to determine the domain divergence. Thereafter, for minimizing the determined domain divergence in the common representation, a loss in the classification ability of the domain regression processor 204 is to be maximized. For example, the maximized loss in the classification ability of the domain regression processor 204 may be represented by equation (5), as shown below:

$$\max_{W',u,b,d} \left( -\frac{1}{m} \sum_{i=1}^{m} L^d(o(x_i^s), 1) - \frac{1}{m'} \sum_{i=1}^{m'} L^d(o(x_i^t), 0) \right) \quad (5)$$

where,

W' and b represent two parameters of the first neural network;

u and d represent two parameters (i.e., adversarial parameters) of the domain regression processor 204;

o(•) represents a function by use of which the domain regression processor 204 predicts a likelihood that an instance is from the source domain or the target domain;

$$-\frac{1}{m}\sum_{i=1}^{m} L^d(o(x_i^s), 1)$$

represents a loss in the classification ability of the domain regression processor 204 for an instance of a source domain, where $L^d(o(x_i^s),1) = -\log(o(x_i^s))$; and $\Sigma_{i=1}^{m'} L^d(o(x_i^t),0)$ represents a loss in the classification ability of the domain regression processor 204 for an instance of a target domain, where $L^d(o(x_i^t),0) = -\log(1-o(x_i^s))$.

A person having ordinary skill in the art will understand that the abovementioned equations are for illustrative purpose and should not be construed to limit the scope of the disclosure.

In an embodiment, for an accurate partitioning of the first hidden layer the domain regression processor 204 may be configured to maintain a trade-off between the source classification error and the domain divergence. The domain regression processor 204 may use one or more techniques, such as stochastic gradient descent technique, known in the art for maintaining a trade-off between the source classification error and the domain divergence. For example, by use of the stochastic gradient descent technique, one or more parameters associated with the first neural network are updated by use of a sample source instance and a sample target instance in the input data for the accurate partitioning of the first hidden layer. The trade-off between the source classification error and the domain divergence may be represented by equation (6), as shown below:

$$\min_{W,V,b,c} \left[ \frac{1}{m}\sum_{i=1}^{m} L(f(x_i^s), y_i^s) \right] + \qquad (6)$$

$$\lambda \max_{W',u,b,d} \left( -\frac{1}{m}\sum_{i=1}^{m} L^d(o(x_1^s), 1) - \frac{1}{m'}\sum_{i=1}^{m'} L^d(o(x_i^t), 0) \right)$$

where, $\lambda$ represents a control parameter that maintains a trade-off between the source classification error and the domain divergence. For example, based on experimental data, $\lambda$ may be set to "0.1."

Notwithstanding, a person having ordinary skill in the art will appreciate that the usage of words, such as minimize, maximize, optimize, and/or any other similar words, in the disclosure are to be construed broadly within the ongoing practical context, and should not be construed as yielding a provable mathematical maximum or optimum solution.

At step 308, one or more unlabeled instances in the plurality of unlabeled instances of the target domain are labeled based on the learned common representation. In an embodiment, the processor 202 may be configured to label the one or more unlabeled instances in the plurality of unlabeled instances of the target domain based on the learned common representation.

Prior to labeling the one or more unlabeled instances in the plurality of unlabeled instances, the processor 202 may be configured to train a generalized classifier based on the learned common representation in the partitioned first hidden layer of the first neural network. The learned common representation may contribute positively in the training of the generalized classifier. The processor 202 may further use the trained generalized classifier to label the one or more unlabeled instances in the plurality of unlabeled instances to generate pseudo-labeled instances of the target domain. In an embodiment, the trained generalized classifier may predict labels for the one or more unlabeled instances of the target domain. The trained generalized classifier may further determine a confidence score for each prediction of label. In an embodiment, the instances that are labeled with a confidence score greater than a predefined threshold are referred to as pseudo-labeled instances of the target domain.

In an embodiment, the classification processor 206 may be further configured to label a plurality of unlabeled instances of the source domain, based on the learned source specific representation and the learned common representation. Alternatively stated, the classification processor 206 may be configured to use the partitioned first hidden layer of the first neural network for labeling the plurality of unlabeled instances of the source domain. The source specific representation and the common representation contribute positively in the classification of the plurality of unlabeled instances of the source domain, such that the source classification error is minimum. In an exemplary scenario, the classification processor 206 may use the first hidden layer of the neural network which comprises the source specific representation and the common representation for the labeling of an unlabeled instance (such as a text segment) of the source domain.

In an embodiment, after labeling of the unlabeled instances of the source domain, the processor 202 may be configured to further determine the source specific representation and the common representation, respectively, from the instances that are newly labeled. Further, based on the determination of the source specific representation and the common representation, the first hidden layer of the first neural network may be updated by the domain regression processor 204 in association with the processor 202. In an exemplary scenario, the labeled instances of the source domain may correspond to a first output layer of the first neural network.

At step 310, a target specific representation corresponding to the target domain is determined based on the one or more labeled instances of the target domain. In an embodiment, the adaptation processor 208 may be configured to determine the target specific representation corresponding to the target domain based on the one or more labeled instances (i.e., the pseudo-labeled instances) of the target domain. The target specific representation may include a plurality of target specific features (for example, a P-dimensional feature vector including unigrams, bigrams, and/or the like) corresponding to the target domain. The identification of the plurality of target specific features from the pseudo-labeled instances may be based on a positive contribution of the identified plurality of target specific features to the adaptation processor 208.

In an embodiment, the adaptation processor 208 may be configured to formulate a second neural network based on the pseudo-labeled instances of the target domain and the learned common representation. The pseudo-labeled instances of the target domain may constitute a second input layer of the second neural network and the learned common representation may constitute a second hidden layer of the second neural network. Further, the determination of the target specific representation by the adaptation processor 208 may correspond to an iterative process, such that the target specific representation may be updated in each iteration of the iterative process.

For example, in the first iteration the target specific representation constituting the plurality of target specific features may be determined based on the pseudo-labeled instances of the target domain. The adaptation processor 208 may add the extracted plurality of target specific features to the second hidden layer. Further, the adaptation processor 208 may re-train the generalized classifier based on the updated second hidden layer (i.e., the learned common representation and the target specific representation determined in the first iteration). Thereafter, the re-trained generalized classifier may be further used to generate new pseudo-labeled instances from remaining one or more unlabeled instances of the target domain. For the second iteration, the new pseudo-labeled instances may constitute the second input layer of the second neural network and the plurality of new target specific features extracted from the new pseudo-labeled instances may be used to update the target specific representation.

The update of the target specific representation may correspond to an addition of the plurality of new target specific features to the target specific representation. The adaptation processor 208 may utilize one or more update rules to extract new features from the pseudo-labeled instances of the target domain. For instance, the one or more update rules may be represented by equation (7), as shown below:

$$\Delta N_{t+1} = \begin{cases} \Delta N_t + 1, & \frac{e_t}{e_{t-1}} < (1 - \epsilon_1) \\ \lfloor \Delta N_t / 2 \rfloor, & \frac{e_t}{e_{t-1}} > (1 - \epsilon_2) \\ \Delta N_t, & \text{otherwise} \end{cases} \quad (7)$$

where, $\Delta N_t$ represents target specific features extracted from the pseudo-labeled instances generated in the $t^{th}$ iteration;

$\Delta N_{t+1}$ represents target specific features to be extracted from the pseudo-labeled instances generated in the $t+1^{th}$ iteration;

$e_t$ represents an objective function value at $t^{th}$ iteration, the objective function may be represented as $$\min_{\theta_N, M} \left[ \frac{1}{n_i^t} \sum_{i=1}^{n^t} L(x_i, y_i) \right],$$

where $n_i^t$ represents pseudo-labeled instances, M represents the set of target specific features to be merged, and $\theta_N$ represents the plurality of new target specific features extracted; and $\epsilon_1$ and $\epsilon_2$ represent hyper parameters that control feature extraction from the pseudo-labeled instances. Based on experimental results, $\epsilon_1$ and $\epsilon_2$ may take values "0.05" and "0.02," respectively.

A person having ordinary skill in the art will understand that the abovementioned exemplary scenario is for illustrative purpose and should not be construed to limit the scope of the disclosure.

The update of the target specific representation may further correspond to a merging of the one or more target specific features to obtain a single feature based on a similarity score between the one or more target specific features. For example, the adaptation processor 208 may merge a first target specific feature in the plurality of target specific features with a second target specific feature in the plurality of target specific features to obtain a single feature. The merging of the first target specific feature and the second target specific feature may be based on the similarity score between the first target specific feature and the second target specific feature. Examples of one or more similarity measures known in the art for the generation of similarity score may include, but are not limited to, cosine similarity measure and Lavenshtein similarity measure.

In an exemplary scenario, $\Delta N$ new target specific features may be added to the second hidden layer in an $i^{th}$ iteration. The adaptation processor 208 may be configured to identify $\Delta M$ pairs (i.e., $2\Delta M$ target specific features) of target specific features from the $\Delta N$ new target specific features with maximum cosine distance. The cosine distance may correspond to the similarity score between the target specific features in the identified pair. The $2\Delta M$ target specific features in the identified pairs may be merged to obtain $\Delta M$ target specific features. The adaptation processor 208 may be further configured to replace the $2\Delta M$ target specific features in the identified pairs with the merged $\Delta M$ target specific features in the second hidden layer. Thereafter, the adaptation processor 208 may be further configured to update the one or more parameters of the second neural network based on the update in the second hidden layer.

A person having ordinary skill in the art will understand that the abovementioned exemplary scenario is for illustrative purpose and should not be construed to limit the scope of disclosure.

In an embodiment, the adaptation processor 208 may continue the iterative process of determining the target specific representation till the classification performance of the re-trained generalized classifier converges. In other words, when the confidence score associated with the label prediction by the generalized classifier exceeds a performance threshold, the classification performance of the generalized classifier may be considered to have converged. For instance, the performance threshold may be "0.9." Thus, when the generalized classifier predicts labels for the remaining one or more unlabeled instances of the target domain with a confidence score greater than "0.9," the classification performance of the generalized classifier may be considered to have converged.

A person having ordinary skill in the art will understand that the scope of the disclosure is not limited to the second input layer comprising only the pseudo-labeled instances of target domain. In another embodiment, the second input layer may further comprise labeled instances of target domain that are labeled by other labeling techniques known in the art, without deviating from the scope of the disclosure.

At step 312, a target specific classifier is trained based on the determined target specific representation and the learned common representation to perform automatic text classification of the remaining one or more unlabeled instances of the plurality of unlabeled instances of the target domain. In an embodiment, the adaptation processor 208 may be configured to train the target specific classifier based on the determined target specific representation and the learned common representation. The determined target specific representation may correspond to the target specific representation obtained after the convergence of the classification performance of the generalized classifier.

In an embodiment, the trained target specific classifier may be further used by the adaptation processor 208 to label the remaining one or more unlabeled instances of the plurality of unlabeled instances of the target domain. The processor 202 may be configured to store the trained target specific classifier in the database server 106 for further classification. The processor 202 may be further configured to render the result of automatic classification (such as text classification, image classification, and/or audio classification) at a user interface of the user-computing device 102 over the communication network 108. A user associated with the user-computing device 102 may use the result of the automatic text classification for data analysis. In another embodiment, the result of the automatic text classification of the plurality of unlabeled instances of the target domain (i.e., a first target domain) may be further used by the processor 202 to classify unlabeled instances of a second target domain automatically. For example, the processor 202 may use the result of the automatic text classification to perform automatic text classification on a real-time text conversation between two users. Control passes to end step 314.

A person having ordinary skill in the art will understand that the scope of the abovementioned flowchart 300 is not limited to automatically perform text classification. In another embodiment, the abovementioned flowchart 300 may be used for performing classification of audio segments, images, and/or the like.

Figure 4:
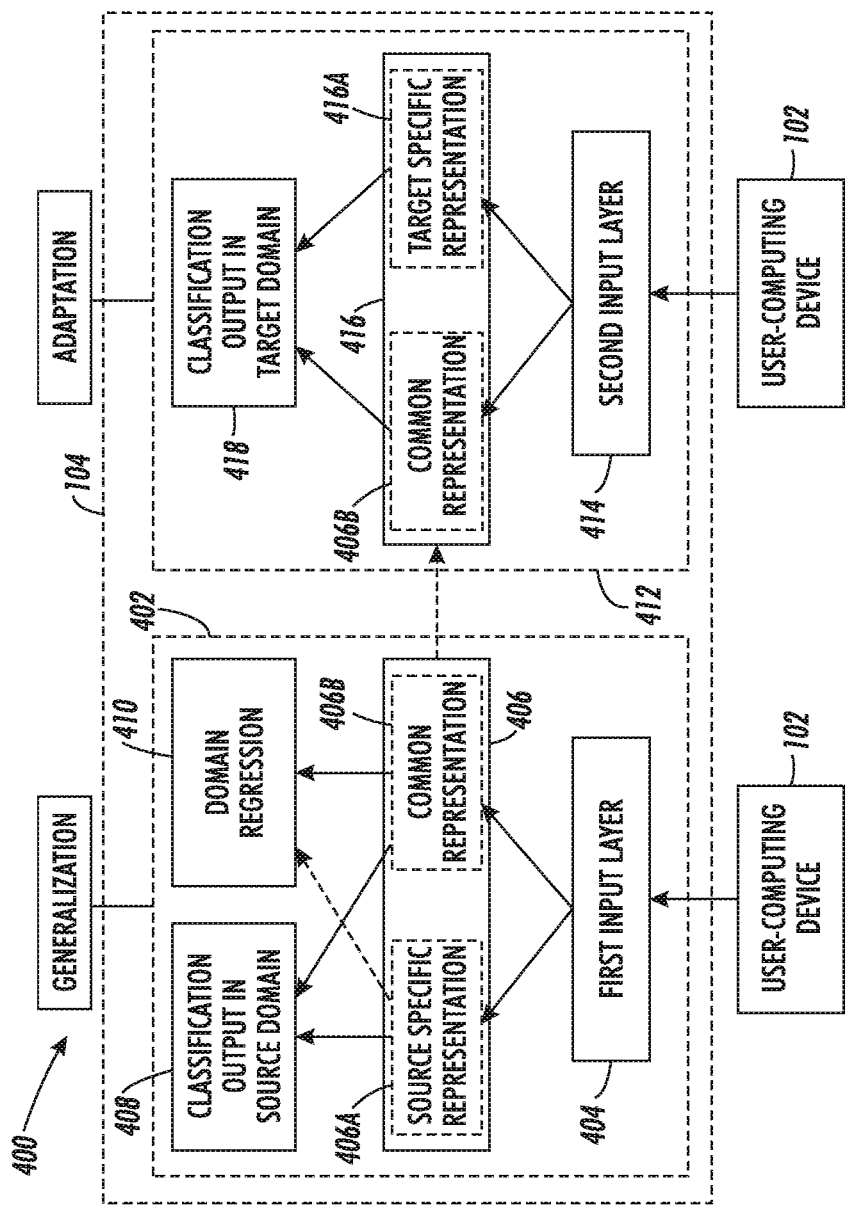
FIG. 4 is a block diagram that illustrates an exemplary scenario for text classification based on learning of transferable feature representations from a source domain for a target domain, in accordance with at least one embodiment.

FIG. 4 is a block diagram that illustrates an exemplary scenario for text classification based on learning of transferable feature representations from a plurality of source domains for a target domain, in accordance with at least one embodiment. FIG. 4 is described in conjunction with FIGS. 1-3. With reference to FIG. 4, there is shown an exemplary scenario 400 that includes the user-computing device 102 and the data processing server 104. The data processing server 104 formulates a first neural network 402 comprising a first input layer 404, a first hidden layer 406, a first output layer 408 ("CLASSIFICATION OUTPUT IN SOURCE DOMAIN"), and a domain regression 410 operation. There is further shown a second neural network 412 formulated by the data processing server 104. The second neural network 412 comprises a second input layer 414, a second hidden layer 416, and a second output layer 418 ("CLASSIFICATION OUTPUT IN TARGET DOMAIN").

The first input layer 404 may be associated with the source specific representation 406A and the common representation 406B in the first hidden layer 406. The association between the source specific representation 406A and the common representation 406B of the first hidden layer 406, and the first input layer 404 is depicted by arrows directed from the first input layer 404 towards both the source specific representation 406A and the common representation 406B.

For the sake of brevity, the exemplary scenario 400 is explained with respect to one source domain. However, it may be understood that the scope of the abovementioned exemplary scenario 400 is not limited to only one source domain. In another embodiment, the abovementioned exemplary scenario 400 may include multiple source domains, without deviating from the scope of the disclosure.

A user (not shown) may use the user-computing device 102 to transmit a plurality of labeled text segments associated with a source domain (such as "BOOKS") to the data processing server 104. The user may have extracted the plurality of labeled text segments from one or more social media websites (not shown) or the database server 106. Each of the plurality of labeled text segments may be associated with a label "0" or "1" based on ratings provided by a plurality of users surfing the one or more social media websites. For example, a text segment that has a rating of "four stars" and above may be labeled "1" and else "0." The user may further transmit a plurality of unlabeled text segments associated with a target domain (such as "KITCHEN APPLIANCES"). The plurality of unlabeled text segments associated with the target domain (such as "KITCHEN APPLIANCES") may correspond to a plurality of text messages exchanged between two users involved in a real-time text conversation regarding the target domain. The user may want to classify the plurality of unlabeled text segments associated with the target domain based on the plurality of labeled text. The plurality of labeled text segments and the plurality of unlabeled text segments provided by the user may correspond to the real-time input data.

After the receipt of the real-time input data, the data processing server 104 may be configured to formulate the first neural network 402 for the classification of the plurality of unlabeled text segments associated with the target domain. The data processing server 104 may determine the first input layer 404 of the first neural network 402 based on the real-time input data. The data processing server 104 may further extract a plurality of features (for example, an N-dimensional feature vector of unigrams and bigrams) from the plurality of labeled text segments of the source domain. The extracted plurality of features may constitute the first hidden layer 406 of the first neural network 402. Thereafter, the data processing server 104 may be configured to partition the first hidden layer 406 based on a segregation of the extracted plurality of features into a plurality of source specific features and a plurality of common features. The plurality of source specific features (e.g., a second M-dimensional feature vector of unigrams and bigrams) may be specific to the source domain and the plurality of common features (e.g., a second K-dimensional feature vector of unigrams and bigrams) may be common between the plurality of labeled text segments of the source domains and the plurality of unlabeled text segments of the target domain. The plurality of source specific features may constitute a source specific representation 406A corresponding to the source domain (such as "BOOKS") and the plurality of common features may constitute a common representation 406B shared between the source domain (such as "BOOKS") and the target domain (such as "KITCHEN APPLIANCES").

The data processing server 104 may segregate the first hidden layer 406 into the source specific representation 406A and the common representation 406B by attaining a minimum source classification error and a minimum domain divergence between the source domain and the target domain. The minimum source classification error may depict that if a classifier is trained based on the source specific representation 406A and the common representation 406B, collectively, the error in the classification of an unlabeled text segment of the source domain by the trained classifier is minimum. The minimum domain divergence may depict that if a classifier is trained based on the common representation 406B, the trained classifier may predict the association of an instance with the source domain and the target domain with equal likelihood. The data processing server 104 may partition the first hidden layer 406 by performing the domain regression 410 operation. By performing the domain regression 410 operation, the data processing server 104 may attain domain independence for the common representation 406B.

The common representation 406B may contribute positively to the domain regression 410 operation for attaining the minimum domain divergence between the source domain and the target domain. The source specific representation 406A may have penalized contribution to the domain regression 410 operation for attaining minimum domain divergence between the source domain and the target domain. The positive contribution of the common representation 406B in the domain regression 410 operation is depicted by solid lines directed from the common representation 406B towards the domain regression 410 operation. The penalized contribution of the source specific representation 406A in the domain regression 410 operation is depicted by dashed lines directed from the source specific representation 406A towards the domain regression 410 operation. The source specific representation 406A and the common representation 406B may further contribute positively to the classification of a plurality of unlabeled text segments of the source domain. The positive contributions of the source specific representation 406A and the common representation 406B in the classification of the plurality of unlabeled text segments of the source domain are depicted by solid lines directed from both of the source specific representation 406A and the common representation 406B towards the first output layer 408 ("CLASSIFICATION OUTPUT IN SOURCE DOMAIN"). The data processing server 104 may further use the common representation 406B of the first hidden layer 406 for training a generalized classifier. The formulated first neural network 402 may represent a generalization step for the classification of the plurality of unlabeled text segments of the target domain.

The data processing server 104 may be further configured to formulate the second neural network 412 for the classification of the plurality of unlabeled text segments associated with the target domain. The formulation of the second neural network 412 may represent an adaptation step for the classification of the plurality of unlabeled text segments of the target domain. The data processing server 104 may label one or more unlabeled text segments of the plurality of unlabeled text segments of the target domain by using the trained generalized classifier to generate the pseudo-labeled instances of the target domain.

The data processing server 104 may determine the second input layer 414 of the second neural network 412 based on the pseudo-labeled instances of the target domain. Thereafter, the data processing server 104 may extract a plurality of target specific features (e.g., a P-dimensional feature vector of unigrams and bigrams) from the pseudo-labeled instances of the target domain to determine a target specific representation 416A. The common representation 406B and the determined target specific representation 416A may constitute the second hidden layer 416 of the second neural network 412. The data processing server 104 may further re-train the generalized classifier based on the second hidden layer 416. The re-training of the generalized classifier and the determination of the target specific representation 416A may be an iterative process. In each iteration, the data processing server 104 may determine new target specific features based on the pseudo-labeled instances of the target domain that were labeled in the previous iteration by the re-trained generalized classifier. The target specific representation 416A may be updated in each iteration based on the determined new target specific features in each iteration. Alternatively stated, the second hidden layer 416 may be updated in each iteration based on the update of the target specific representation 416A. The update of the target specific representation 416A in each iteration may include an addition of the determined new target specific features in each iteration. The update of the target specific representation 416A in each iteration may further include a merging of one or more target specific features in the target specific representation 416A to obtain a single target specific feature. For example, a first target specific feature may be merged with a second target specific feature in the target specific representation 416A to obtain a single target specific feature. The merging of the one or more target specific features may be based on the similarity score between the one or more target specific features. For example, two target specific features in the target specific representation 416A that has a maximum cosine distance between them may be merged. The cosine distance may correspond to a similarity score, such that a high cosine distance represents high similarity.

The data processing server 104 may be configured to terminate the iterative process based on a convergence of the classification performance of the re-trained generalized classifier. For example, if a difference in the performance of the trained generalized classifier in the classification of the plurality unlabeled text segments of the target domain in two consecutive iterations exceeds the performance threshold (pre-specified by the user); the data processing server 104 may terminate the iterative process. The data processing server 104 may be configured to train a target specific classifier based on the common representation 406B and the target specific representation 416A (i.e., the second hidden layer 416) after the termination of the iterative process. The trained target specific classifier may be used to further classify (i.e., label) remaining one or more unlabeled text segments in the plurality of unlabeled text segments of the target domain. The result of the classification in the target domain may be stored in the second output layer 418 ("CLASSIFICATION OUTPUT IN TARGET DOMAIN"). The data processing server 104 may further render the result of the automatic text classification through a user-interface on the display screen of the user-computing device 102 to be presented to the user.

In an embodiment, the data processing server 104 may further use the formulated first neural network 402 for the classification of unlabeled text segments of the source domain. The data processing server 104 may further update the first hidden layer 406 based on the text segments of the source domain that are labeled by the use of the formulated first neural network 402. The result of the classification in the source domain may be stored in the first output layer 408 ("CLASSIFICATION OUTPUT IN SOURCE DOMAIN").

A person having ordinary skill in the art will understand that the scope of the abovementioned exemplary scenario 400 is not limited to one source domain. In an embodiment, the data processing server 104 may formulate the first neural network 402 for multiple source domains and one target domain. Further, the scope of the second input layer 414 is not limited to include the plurality unlabeled text segments of the target domain. In another embodiment, the second input layer 414 may include to labeled text segments of the target domain that are previously labeled by other labeling techniques known in the art. Thus, in this scenario, the target specific representation 416A may be further updated based on new target specific features extracted from the labeled text segments of the target domain that are previously labeled by other labeling techniques known in the art.

The disclosed embodiments encompass numerous advantages. The disclosure provides a domain adaptation method and a system for text classification based on learning of transferable feature representations from a source domain for a target domain. The disclosed domain adaptation method and system mitigates negative transfer of domain specific features (resulted due to learning a common representation for transferring knowledge from the source to the target domain) by learning common representations as well as domain specific features for text classification. Thus, the disclosed domain adaptation method and a system learn common representation while simultaneously minimizing the effect of domain specific features. The disclosed domain adaptation method and system further adapts the learned common representations for learning target specific features to enhance the accuracy of classification in target domain. Thus, improving the performance and efficiency of the system for domain adaptation. The effectiveness of the proposed neural network architecture to learn domain specific and common representation is evaluated for a cross-domain text classification problem. In the disclosed domain adaptation method and system, the domain specific representation is well segregated from the common representation which leads to improved generalization to the target domain.

The disclosed domain adaptation method and system for learning transferable representations between two domains may be extended to multiple source domains and leverage additional complementary information from different source domains for enhanced adaptation performance. The disclosed domain adaptation method and system with one hidden layer performs better (or comparable to) than other deep architecture which do not explicitly exclude the domain specific representations from the common shared representations. However, the disclosed domain adaptation method and system may also be extended to deep architecture by including additional number of hidden layers following the same underlying principle, without loss of generality. Further, the learning of target specific representation is not affected by use of target instances that are labeled based on the learned common representation or target instances that are labeled previously by any other known technique known in the art. Thus, the performance of the disclosed domain adaptation method and system is independent of the input used for adapting the learned common representation for the target domain.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as receipt of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the domain adaptation methods and systems for text classification based on learning of transferable feature representations from a source domain have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A domain adaptation method for learning transferable feature representations from a source domain for a target domain, the domain adaptation method comprising:
formulating, by one or more processors, first and second neural networks, wherein the first neural network comprises a first hidden layer and the second neural network comprises a second hidden layer, and both the first and second hidden layers are partitioned;
receiving, by the one or more processors, real-time input data comprising a plurality of labeled instances of the source domain and a plurality of unlabeled instances of the target domain;
inputting, by the one or more processors, the plurality of labeled instances of the source domain into the first neural network;
learning, by the first neural network a, a common representation shared between the source domain and the target domain, based on the plurality of labeled instances of the source domain, wherein the first hidden layer comprises and is partitioned between the common representation and a source specific representation;
inputting, by the one or more processors, the unlabeled instances of the target domain into the second neural network;
labeling, by the second neural network, one or more unlabeled instances in the plurality of unlabeled instances of the target domain, based on the learned common representation;
determining, by the second neural network, a target specific representation corresponding to the target domain, based on the one or more labeled instances of the target domain, wherein the second hidden layer comprises and is partitioned between the learned common representation and the target specific representation; and
training, by the second neural network, a target specific classifier based on the determined target specific representation and the learned common representation to perform automatic text classification on remaining one or more unlabeled instances of the plurality of unlabeled instances of the target domain.

2. The domain adaptation method of claim 1, wherein the determination of the target specific representation is an iterative process, wherein the target specific representation is updated by addition of new target specific features in each iteration in the iterative process.

3. The domain adaptation method of claim 2, wherein the common representation comprises a plurality of common features shared between the source domain and the target domain, wherein the target specific representation comprises a plurality of target specific features corresponding to the target domain, wherein the plurality of target specific features is identified based on a positive contribution of the plurality of target specific features.

4. The domain adaptation method of claim 3, further comprising merging, by the second neural network, a first target specific feature in the plurality of target specific features with a second target specific feature in the plurality of target specific features to obtain a single feature, based on a similarity score between the first target specific feature and the second target specific feature.

5. The domain adaptation method of claim 1, wherein:
the learning of the common representation is based on a minimization of a domain divergence between the source domain and the target domain; and
the minimization of the domain divergence between the source domain and the target domain is based on a prediction of a likelihood that an instance is from the source domain or the target domain.

6. The domain adaptation method of claim 1, further comprising:
learning, by the first neural network, the source specific representation corresponding to the source domain, based on the plurality of labeled instances of the source domain, wherein the source specific representation comprises a plurality of source specific features corresponding to the source domain; and
classifying, by the first neural network, a plurality of unlabeled instances of the source domain, based on the source specific representation and the common representation.

7. The domain adaptation method of claim 6, wherein the classification of the plurality of unlabeled instances of the source domain is based on a minimization of a source classification error such that the source specific representation and the common representation contribute positively to the source classification error.

8. The domain adaptation method of claim 1, wherein:
the first neural network comprises a first input layer, the first hidden layer, and a first output layer; and
the second neural network comprises a second input layer, the second hidden layer, and a second output layer.

9. A domain adaptation system for learning transferable feature representations from a source domain for a target domain, the domain adaptation system comprising:
one or more processors configured to:
formulate first and second neural networks, wherein the first neural network comprises a first hidden layer and the second neural network comprises a second hidden layer, and both the first and second hidden layers are partitioned,
receive real-time input data comprising a plurality of labeled instances of the source domain and a plurality of unlabeled instances of the target domain,
input the plurality of labeled instances of the source domain into the first neural network, and
input the unlabeled instances of the target domain into the second neural network;
the first neural network configured to learn a common representation shared between the source domain and the target domain, based on the plurality of labeled instances of the source domain, wherein the first hidden layer comprises and is partitioned between the common representation and a source specific representation; and
the second neural network configured to:
label one or more unlabeled instances in the plurality of unlabeled instances of the target domain, based on the learned common representation, determine a target specific representation corresponding to the target domain, based on the one or more labeled instances of the target domain, wherein the second hidden layer comprises and is partitioned between the learned common representation and the target specific representation, and train a target specific classifier based on the determined target specific representation and the learned common representation to perform automatic text classification on remaining one or more unlabeled instances of the plurality of unlabeled instances of the target domain.

10. The domain adaptation system of claim 9, wherein the determination of the target specific representation is an iterative process, wherein the target specific representation is updated by addition of new target specific features in each iteration in the iterative process.

11. The domain adaptation system of claim 10, wherein the common representation comprises a plurality of common features shared between the source domain and the target domain, wherein the target specific representation comprises a plurality of target specific features corresponding to the target domain, wherein the plurality of target specific features is identified based on a positive contribution of the plurality of target specific features.

12. The domain adaptation system of claim 11, wherein the second neural network is further configured to merge a first target specific feature in the plurality of target specific features with a second target specific feature in the plurality of target specific features to obtain a single feature, based on a similarity score between the first target specific feature and the second target specific feature.

13. The domain adaptation system of claim 9, wherein the first neural network is further configured to:

learn the source specific representation corresponding to the source domain, based on the plurality of labeled instances of the source domain, wherein the source specific representation comprises a plurality of source specific features corresponding to the source domain; and classify a plurality of unlabeled instances of the source domain, based on the source specific representation and the common representation.

14. The domain adaptation system of claim 9, wherein:
the first neural network comprises a first input layer, the first hidden layer, and a first output layer; and
the second neural network comprises a second input layer, the second hidden layer, and a second output layer.

15. A computer program product for use with a computer, the computer program product comprising a non-transitory computer readable medium, wherein the non-transitory computer readable medium stores a computer program code for domain adaptation for learning transferable feature representations from a source domain for a target domain, wherein the computer program code is executable by one or more processors to:

formulate first and second neural networks, wherein the first neural network comprises a first hidden layer and the second neural network comprises a second hidden layer, and both the first and second hidden layers are partitioned;

receive real-time input data comprising a plurality of labeled instances of the source domain and a plurality of unlabeled instances of the target domain;

input the plurality of labeled instances of the source domain into the first neural network, and input the unlabeled instances of the target domain into the second neural network;

learn, by the first neural network, a common representation shared between the source domain and the target domain, based on the plurality of labeled instances of the source domain, wherein the first hidden layer comprises and is partitioned between the common representation and a source specific representation;

label, by the second neural network, one or more unlabeled instances in the plurality of unlabeled instances of the target domain, based on the learned common representation;

determine, by the second neural network, a target specific representation corresponding to the target domain, based on the one or more labeled instances of the target domain, wherein the second hidden layer comprises and is partitioned between the learned common representation and the target specific representation; and train, by the second neural network, a target specific classifier based on the determined target specific representation and the learned common representation to perform automatic text classification on remaining one or more unlabeled instances of the plurality of unlabeled instances of the target domain.

16. The computer program product of claim 15, wherein:
the first neural network comprises a first input layer, the first hidden layer, and a first output layer; and
the second neural network comprises a second input layer, the second hidden layer, and a second output layer.

* * * * *